(12) United States Patent
Rohner et al.

(10) Patent No.: US 8,796,946 B2
(45) Date of Patent: Aug. 5, 2014

(54) EMERGENCY LIGHTING DEVICE FOR OPERATING A LIGHT SOURCE, IN PARTICULAR AN LED

(75) Inventors: Daniel Rohner, Vienna (AT); Alexander Mair, Vienna (AT)

(73) Assignee: Tridonicatco GmbH & Go KG (AT)

( * ) Notice: Subject to any disclaimer, the term of this patent is extended or adjusted under 35 U.S.C. 154(b) by 0 days.

(21) Appl. No.: 13/307,268

(22) Filed: Nov. 30, 2011

(65) Prior Publication Data

US 2012/0068601 A1 Mar. 22, 2012

Related U.S. Application Data

(62) Division of application No. 12/297,900, filed as application No. PCT/EP2007/003223 on Apr. 11, 2007, now Pat. No. 8,716,936.

(30) Foreign Application Priority Data

Apr. 21, 2006 (DE) .......................... 10 2006 018 531
Jul. 3, 2006 (DE) .......................... 10 2006 030 655

(51) Int. Cl.
*G05F 1/00* (2006.01)
(52) U.S. Cl.
USPC ............................. 315/291; 315/307; 315/308

(58) Field of Classification Search
CPC ........... H05B 33/0815; H05B 37/0272; H05B 33/0818; H05B 33/0842; Y02B 20/346
USPC .......... 315/86–88, 72, 91, 129, 185 R, 209 R, 315/262, 274, 287, 291, 297, 307
See application file for complete search history.

(56) References Cited

U.S. PATENT DOCUMENTS

| | | | |
|---|---|---|---|
| 5,214,352 A * | 5/1993 | Love | ................................. 315/86 |
| 6,933,678 B2 * | 8/2005 | Kuo | ................................. 315/86 |
| 8,680,778 B2 * | 3/2014 | Stevens et al. | ................. 315/291 |
| 2005/0127842 A1 * | 6/2005 | Kuo | ................................. 315/86 |
| 2007/0069656 A1 * | 3/2007 | Huang | ............................. 315/86 |
| 2009/0026962 A1 * | 1/2009 | Zilberberg | ....................... 315/86 |

\* cited by examiner

*Primary Examiner* — Thienvu Tran
(74) *Attorney, Agent, or Firm* — Cantor Colburn LLP

(57) ABSTRACT

An LED driver for operating a light source, in particular an LED, includes an energy storage unit, a driver circuit supplied by the energy storage unit during emergency lighting operation, for operating the light source, and a control unit that activates the driver circuit in such a way that the light source is operated with a constant power or constant current irrespective of the state of charge of the energy storage unit, where the control unit, for the purpose of regulating the power, determines indirectly the level of the current supplied to the light source.

7 Claims, 1 Drawing Sheet

EMERGENCY LIGHTING DEVICE FOR OPERATING A LIGHT SOURCE, IN PARTICULAR AN LED

CROSS REFERENCE TO RELATED APPLICATIONS

This application is a divisional of U.S. patent application Ser. No. 12/297,900 filed on 22 Oct. 2009 which was the U.S. national stage filing of International Patent Application Serial Number PCT/EP2007/003223 filed on 11 Apr. 2007 which claimed priority to German Patent Application Serial Numbers 10-2006-018531.5 and 10-2006-030655.4 filed on 21 Apr. 2006 and 3 Jul. 2006, respectively, the entire contends of all of said applications being incorporated herein by reference.

TECHNICAL FIELD OF THE INVENTION

The present invention relates to an emergency lighting device intended for operating a light source, in particular an LED.

BRIEF SUMMARY OF THE INVENTION

Emergency lighting devices are essential for realizing, in larger buildings or complexes, lighting systems that provide adequate lighting even in the event of failure of the general mains power supply. Evacuation or assistance measures can be performed safely only if certain relevant parts or areas of buildings continue to be illuminated in the event of failure of the electric power supply. Accordingly, such emergency lighting devices are used, in particular, for illuminating escape routes and the like.

Emergency lighting devices of the generic type accordingly have, as a central element, an energy storage unit, in particular a battery or accumulator, that is charged by the general mains supply voltage during a normal, or charging, operation. Provided for this purpose is a charging circuit that is connected on the input side to the mains supply voltage and, during the charging operation, permanently supplies energy to the energy storage unit, which stores this energy. Changeover to emergency lighting operation, in which the light source is activated and operated, for which purpose—insofar as necessary—the energy provided by the energy storage unit is used, is effected only in the event of the occurrence of an emergency state, which is usually identified automatically by such devices, through monitoring of the mains supply voltage. Since the storage capacity of the energy storage unit is clearly limited, light sources that consume relatively little energy are used by preference. Accordingly, such emergency lighting devices are preferably equipped with gas discharge lamps, in particular fluorescent tubes. Increasingly, however, light sources in the form of light-emitting semiconductors, in particular LEDs, are being used, since these light sources also have high efficiency and, accordingly, can be used in an energy-saving manner.

The monitoring of the mains supply voltage, which is therefore performed to enable emergency lighting operation to be initiated in a timely manner, is usually effected by a control unit that evaluates signals supplied to it and assesses the state of the mains supply voltage on the basis of these signals. In the case of known circuits, the mains supply voltage itself is measured in an obvious manner. This then gives rise to the problem, however, that the sensors for determining the state of the mains supply voltage are at mains potential, and must be galvanically isolated from the other circuit areas of the emergency-lighting device that are at the voltage level of the energy storage unit or LED. The potential isolation required for this purpose is not only expensive, but moreover also occupies a relatively large amount of space in the emergency lighting device.

BRIEF SUMMARY OF THE INVENTION

The invention concerns an improved concept for an emergency lighting device in which the disadvantages described above are avoided.

Core concept of the present invention is that, in contrast to known solutions, the mains supply voltage is now monitored only in an indirect manner in order to initiate emergency lighting operation if necessary. For this purpose, only measurement values at the potential of the energy storage unit or LED are acquired, and the state of the mains supply voltage is deduced on the basis of these measurement values, with the aid of further information.

There is accordingly proposed according to the invention an emergency lighting device for operating a light source, in particular an LED, the emergency lighting device having:
an energy storage unit,
a charging circuit to be supplied with a mains supply voltage for charging the energy storage unit during a charging operation of the emergency lighting device, the charging circuit having potential isolation, and
a driver circuit supplied by the energy storage unit during operation of the emergency light, for operating the light source, the device further having a control unit that is designed to monitor the state of the mains supply voltage during the charging operation, and to activate emergency lighting operation upon identifying an emergency state. In this case, according to the invention provision is made whereby the control unit determines the state of the mains supply voltage on the basis of operating quantities of the emergency lighting device that are measured on the output side of the charging circuit.

It is ensured, through the measures according to the invention, that an emergency state affecting the voltage supply can still be reliably identified and emergency lighting operation can be initiated accordingly. At the same time, however, the necessary galvanic isolation between the means for monitoring the mains supply voltage and the other components of the emergency lighting device has been omitted, so that the device, taken as a whole, can be realized in a less expensive and more compact manner.

Preferably, the charging circuit has a controllable switch and a transformer, the charging circuit being able to be constituted, in particular, by a so-called flyback converter. The controllable switch is activated by the control unit of the emergency lighting device, the activation in this case being able to be effected via an optocoupler.

The state of the mains supply voltage is now determined, in particular, with account being taken of the duty cycle, selected by the control unit, for activating the switch of the flyback converter or of the charging circuit. The secondary voltage of the flyback converter or, in the case of other switched-mode power supply topologies, the charging power for the energy storage unit is further taken into account for this purpose. This charging power can be can be easily determined by the control unit during the charging operation, i.e. with the light source switched off, since the values to be measured for this purpose, namely, voltage and current of the energy storage circuit, relate to the same basic potential that the further components of the emergency lighting device are also at. The same also applies to the secondary voltage to be measured in the case of use of the flyback converter. In both cases, therefore, the galvanic isolation, between the measuring devices and the control unit, that is necessary in the case of the prior art can be omitted.

A further advantageous development of the present invention relates to the measures for operating the light source, in particular the LED, during emergency lighting operation. For this purpose, the driver circuit is preferably realized as a switching regulator and accordingly has a further controllable switch that, in turn, is activated by the control unit. The activation of the switch in this case is such that the light source can be operated with a constant power or constant current irrespective of the state of charge of the energy storage unit. This measure is of particular importance, since the power of the energy storage unit clearly declines over time, which, however, should not affect the light intensity of the emergency lighting device.

In the case of an LED being used as a light source, in order to render possible the desired power regulation it would accordingly be obvious, in turn, to measure the actual diode current that determines the lighting power. According to a particularly advantageous development of the present invention, however, provision is made whereby there is no measurement of the diode current and, instead, the current, or the power, of the light source is measured or estimated indirectly on the basis of other parameters. In particular, preferably only the voltage present at the light source is determined, and the diode current is then deduced from further information, the power loss of the driver circuit, in particular, being taken into account in this case. The power of the light source can then be determined, without direct measurement of the diode current, by means of previously determined matching tables stored in the control unit, such that an almost constant lighting power can be set by the control unit. The regulation of the lighting power in this case is effected, in particular, through corresponding clocking of the controllable switch of the driver circuit, since in this way the power with which the light source is operated can be set in a very simple and elegant manner.

Moreover, this particular measure, for operating the light source with an almost constant power, with no direct measurement of the current, can also be used independently of the concept according to the invention, described at the beginning, of indirect monitoring of the mains power supply.

BRIEF DESCRIPTION OF THE FIGURES

The invention is to be explained more fully in the following with reference to the accompanying drawing, wherein.

DETAILED DESCRIPTION OF THE INVENTION

Figure 1:
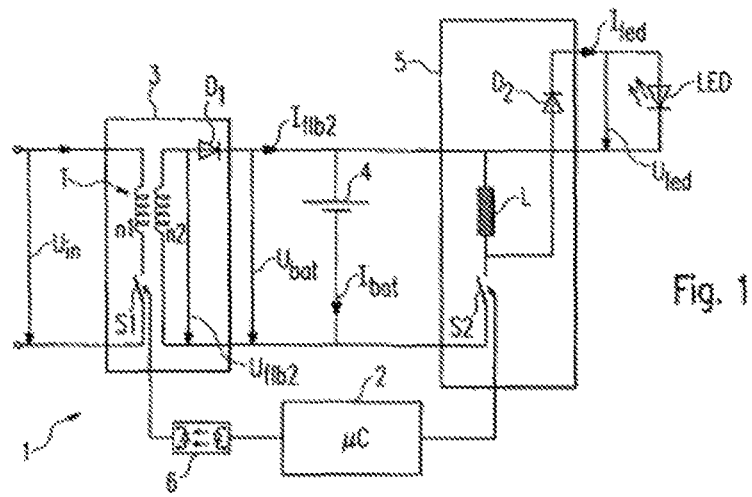
FIG. 1 shows, in schematic form, the circuit diagram of a first embodiment of an emergency lighting device according to the invention.

In the embodiment represented, the emergency lighting device according to the invention, which in FIG. 1 is represented in a simplified manner and denoted by the reference 1, is intended for operation of an LED as an emergency lighting source. The emergency lighting device 1 is connected, on the input side, to an electric power supply network providing a mains supply voltage $U_{in}$, and comprises, as essential components, a control unit 2, a charging circuit 3, an energy storage unit 4 in the form of a battery or accumulator, and a driver circuit 5. In the represented first embodiment, the charging circuit 3 is constituted by a so-called flyback converter that, on the one hand, has a transformer T comprising a primary winding n1 and a secondary winding n2 and, on the other hand, has a controllable switch S1. In known manner, the energy provided by the mains supply voltage $U_{in}$ can be transferred to the secondary side of the flyback converter 3 through appropriate alternating opening and closing of the switch S1, and used for charging the energy storage unit 4. The transfer of energy in this case is effected when the switch S1 is in the open state, a diode $D_1$ additionally being provided for this purpose on the output side of the flyback converter 3. Such flyback circuits are used in many instances in such emergency lighting devices, owing to their simple structure and their reliable functioning.

The activation of the controllable switch S1 is effected by the control unit 2 of the emergency lighting device, the activation being effected, in particular, with galvanic isolation, via an optocoupler 6. The control unit 2 in this case activates the switch S1 alternately, the so-called duty cycle D1 for the switching operation of the switch S1 being calculated as follows:

$$D1 = t_{on1}/(T - t_{on1})$$

$t_{on1}$ in this case corresponds to the on-time of the switch, while T denotes the total duration of a complete switching cycle for the switch S1.

It is also conceivable for the activation of S1 to be a 'free oscillator', and for the natural frequency of the 'free oscillator' to be influenced by the optocoupler 6 via the duty cycle.

During a charging operation of the emergency lighting device 1, usually it is exclusively the charging circuit 3 that is active, for the purpose of continually charging the battery 4. An emergency lighting operation, in which the driver circuit 5 is used to activate the LED, is initiated only in the event of an emergency state, which is characterized, in particular, by deviations in the power supply voltage $U_{in}$ from predetermined setpoint values. For this purpose, the driver circuit 5 realized as a switching regulator has a further controllable switch S2, an inductor L and a diode $D_2$. Through alternating activation of the switch S2 by the control unit 2, the LED is provided with a current by means of which this LED is operated. The pulse duty factor with which the switch S2 is activated by the control unit 2 can be varied in this case in order to set the level of the current supplied to the LED, and thereby the power with which the LED is operated. In this way it can be ensured, in a very elegant manner, that, even in the case of fluctuating battery power, the LED is nevertheless operated with constant brightness.

A first essential function of the emergency lighting device 1 therefore consists in identifying, through assessment of the mains supply voltage $U_{in}$, whether an emergency state exists, in order to initiate emergency lighting operation if necessary. There has been known hitherto for this purpose the practice of directly determining the value of the input voltage $U_{in}$ for the charging circuit 3, this, however, being associated with disadvantages, for the reasons previously stated.

According to the present invention, therefore, there is now no direct measurement of the mains supply voltage $U_{in}$. Instead, provision is made for indirectly determining this mains supply voltage. In particular, provision is made whereby only magnitudes of operating parameters of the emergency lighting device 1 are measured on the secondary side of the charging circuit 3.

In the case of the first embodiment according to FIG. 1, the voltage $U_{fb2}$ present on the secondary side of the isolating transformer or flyback converter 3 is measured for this purpose, for which, in particular, no galvanic isolation is required, since this quantity is at the same reference potential as the control unit 2 that evaluates the measurement value. If the level of this secondary voltage $U_{fb2}$ is then known, the level of the input voltage $U_{in}$ can be deduced therefrom. This is because, when the switch S1 of the flyback converter 3 has been switched on, there is a relationship between input voltage $U_{in}$ and secondary voltage $U_{fb2}$ that is dependent, in particular, on the winding ratio between the two windings n1 and n2 of the transformer T and on the duty cycle of the switch D1. This relationship between the easily measured secondary voltage $U_{fb2}$ and the input voltage $U_{in}$ to be monitored is now stored, in the form of a value table, in the control unit 2, so that the latter, after measurement of the secondary voltage $U_{fb2}$, can easily determine the level of the input voltage $U_{in}$ without having to measure this input voltage directly. If the control unit 2 now finds that the determined input voltage $U_{in}$ lies outside determined setpoint ranges, this indicates an emergency state, which, in turn, will cause the control unit 2 to initiate emergency operation.

The described solution thus renders possible very simple but effective monitoring of the state of the general electric power supply. Further, a particular advantage of the embodiment represented in FIG. 1 consists in that the level of the input voltage $U_{in}$ can be determined irrespective of whether or not the emergency lighting LED is switched on. This is because the diode $D_1$, through its blocking action, effects isolation between secondary voltage $U_{fb2}$ and battery voltage $U_{Bat}$, so that the activity of the driver circuit 3 does not act upon the previously described operation of determination of the input voltage $U_{in}$.

Figure 2:
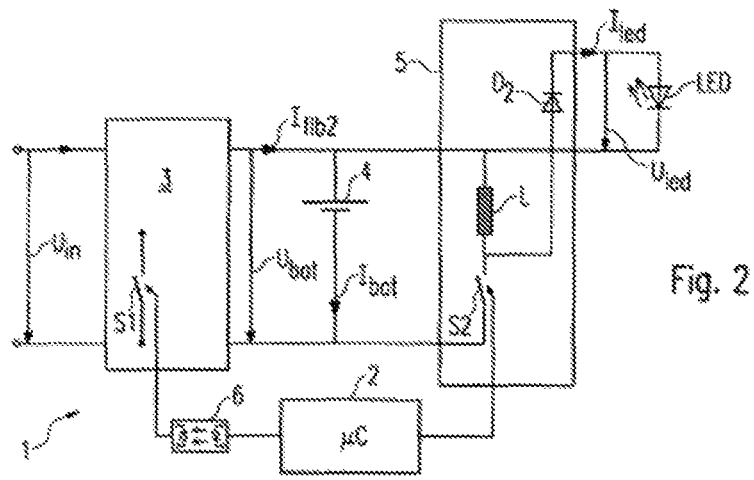
FIG. 2 shows a second embodiment of an emergency lighting device.

A second, somewhat more general embodiment of an emergency lighting device according to the invention is represented in FIG. 2. In its structure, this device corresponds substantially to the emergency lighting device 1 shown in FIG. 1, but the charging circuit 3 is now constituted, not by a flyback converter, but generally by a circuit arrangement having potential isolation and a switch S1 again activated by the control unit 2.

In the case of this more general embodiment, there is not necessarily a known relationship between the input voltage $U_{in}$ and the voltage on the output side of the charging circuit 3. Nevertheless, in this case likewise, the level of the input voltage $U_{in}$ can be determined indirectly, but with other operating quantities now being measured for this purpose.

These are, on the one hand, the battery voltage $U_{bat}$ and, on the other hand, the battery current $I_{bat}$. Both quantities can again be determined in a relatively simple manner, i.e. without galvanic isolation, since they are again at the same reference potential as the control unit 2 that evaluates these measurement quantities.

Figure 3:
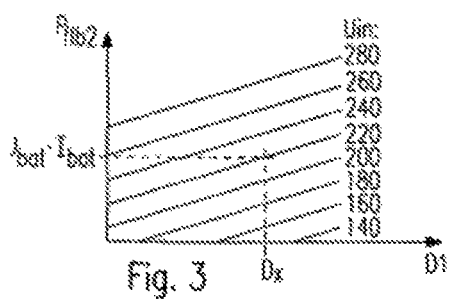
FIG. 3 shows a graph for determining the mains supply voltage on the basis of operating parameters measured on the output side of the charging circuit.

On the basis of these two measurement quantities $U_{bat}$ and $I_{bat}$ and of the known duty cycle D1 for the switch S1 of the charging circuit 3, it is then possible to determine the input voltage $U_{in}$, since there is a relationship between the latter and the three known quantities. This is illustrated by the graph of FIG. 3, which shows differing characteristics of the secondary power $P_{fb2}$ of the charging circuit 3 in dependence on the duty cycle D1 for the switch S1. These characteristics are determined, for example, during production of the emergency lighting device, and are again stored in the form of a table in the control unit 2. It can be seen that these characteristics are also dependent, in particular, on the input voltage $U_{in}$. Therefore, if the duty cycle D1 and the secondary power $P_{fb2}$ of the charging circuit 3 are then known, the level of the input voltage $U_{in}$ can be deduced, as in the case of the example of FIG. 1.

In the represented example of FIG. 3, therefore, there is determined that characteristic with which the known combination, of duty cycle D1 and secondary power $P_{fb2}$ of the charging circuit 3, that, with the driver circuit 5 deactivated, corresponds to the product of battery voltage $U_{bat}$ and battery current $I_{bat}$, is in conformity. In the case of the represented measurement values, for example, this value lies on the characteristic for an input voltage $U_{in}$ of 220 volt, which corresponds to a correct state of the general mains supply. However, should the determined value lie on a characteristic corresponding, for example, to an input voltage $U_{in}$ of 140 volt or 280 volt, the control unit 2 would in turn interpret this as a fault being present in the mains supply, and accordingly initiate an emergency state.

In both embodiments shown, therefore, it can be ascertained reliably and without the need for direct measurement of the input voltage $U_{in}$ whether or not the mains supply is satisfactory. However, a limitation in the case of the example of FIG. 2 consists in that the described determination of the input voltage $U_{in}$, is possible only when the driver circuit 5 is in the off state. In the case of the example of FIG. 1, by contrast, this limitation—as already mentioned—does not exist. Fundamentally, however, the control unit 2, in the event of identification of a fault, will cause the driver circuit 5 to be activated and, accordingly, cause the LED to be switched on.

Following activation of the driver circuit 5, the switch S2 can then be activated at high frequency, in the manner previously described, in order to operate the LED with the desired power. In order to ensure in this case that the power of the LED is constant, it would be necessary to know both the LED voltage $U_{led}$ and the LED current $I_{led}$ for regulation to be rendered possible. According to a particularly advantageous development, however, only the LED voltage $U_{led}$ is measured, and the current $I_{led}$, or the power $P_{led}$ resulting therefrom, is determined indirectly by the control unit 2, as is to be explained more fully in the following.

To enable the diode current $I_{led}$ to be determined indirectly, at least the quantities battery voltage $U_{bat}$, battery current $I_{bat}$ and—in the case of the example of FIG. 1—secondary voltage $U_{fb2}$ and additionally the LED voltage $U_{led}$ are now measured. The further information required for regulating the LED current $I_{led}$ can then be calculated therefrom, for which purpose, however, there is required yet further information, which is not acquired through actual-value measurements, but which is stored as value tables in the control unit 2.

The first value table is the information, already mentioned above, regarding the relationship between duty cycle D1, secondary voltage $U_{fb2}$ and input voltage $U_{in}$ in the case of the example of FIG. 1, or between duty cycle D1, battery voltage $U_{bat}$, battery current $I_{bat}$ and input voltage $U_{in}$ in the case of the more general example of FIG. 2. Further, for the purpose of determining the diode current, it is also necessary that the power loss $P_{lost}$ of the driver circuit 5 be known, which power loss is dependent on the difference between the measured LED voltage $U_{led}$ and the likewise measured battery voltage $U_{bat}$, so that the following applies:

$$P_{lost} = f(U_{led} - U_{bat})$$

The third required information, finally, is the secondary power $P_{fb2}$ of the charging circuit 3, which is present in the case of an activated driver circuit and which is a function of the duty cycle D1, the input voltage $U_{in}$ and the battery voltage $U_{bat}$. The relationship between these quantities is represented in FIG. 4, where it can be seen that the secondary power $P_{fb2}$ of the charging circuit 3 is dependent primarily on the input voltage $U_{in}$ and the duty cycle D1 for the switch S1, although it can also additionally vary on the basis of the battery voltage $U_{bat}$.

Figure 4:
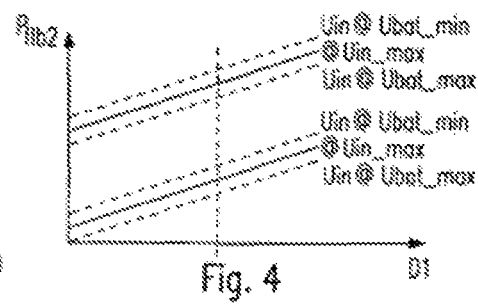
FIG. 4 shows a graph for determining the secondary power of the charging circuit, which secondary power is taken into account for indirect determination of the light source power.

If the input voltage $U_{in}$ has now been determined (in the case of the example of FIG. 2, with the driver circuit 5 first switched off if applicable) on the basis of the previously described measures, the secondary power $P_{fb2}$ of the charging circuit 3 can be determined on the basis of the relationship in FIG. 4, even with the driver circuit 5 activated. There are then known, therefore, the measured quantities battery voltage $U_{bat}$, battery current $I_{bat}$, if applicable secondary voltage $U_{fb2}$ and LED voltage $U_{led}$, the duty cycle D1 for the switch S1 set by the control unit, and the further quantities, determined on the basis of the stored value tables, input voltage $U_{in}$, secondary power $P_{fb2}$ of the charging circuit 3 and power loss $P_{lost}$ of the driver circuit 5.

The knowledge of these quantities, in turn, renders possible determination, firstly, of the current $I_{fb2}$ on the secondary side of the charging circuit 3 according to the following relationship:

$$I_{fb2}=P_{fb2}/U_{bat}$$

Finally, the LED current $I_{led}$ and the LED power $P_{led}$ can also be calculated according to the following equations;

$$I_{led}=(P_{fb2}-U_{bat}\cdot I_{bat}-P_{lost})/U_{led}$$

$$P_{led}=P_{fb2}-U_{bat}\cdot I_{bat}-P_{lost}$$

Both equations apply to the case of the charging circuit 3 continuing to be active, i.e., whereby at least a certain electric power supply is still available. This can be the case, for example, if emergency lighting operation has been brought about in another manner. By contrast, in the case of the electric power supply failing completely and emergency lighting operation being maintained solely by the battery, the following simplified equations apply:

$$I_{led}=(U_{bat}\cdot I_{bat}-P_{lost})/U_{led}$$

$$P_{led}=U_{bat}\cdot I_{bat}-P_{lost}$$

Finally, the current actual value of the LED current $I_{led}$ and the current power $P_{led}$ can be determined indirectly, and used for regulation. The corresponding calculations are performed by the control unit 2.

The advantage of these indirect determinations of the actual values necessary for regulation consists in that it is possible to dispense with a measurement of an additional operating parameter of the emergency lighting device, which, in turn, results in a further simplification of the device as a whole. Since, in this instance, some use can be made of parameters already determined or measured for the purpose of determining the input voltage in any case, this indirect determination of the LED current therefore constitutes a particularly advantageous development of the concept of the indirect determination of the input voltage described at the beginning. However, a corresponding indirect current and power determination for the light source could also be used in the case of other devices in which the first concept according to the invention is not realized. For example, this procedure is appropriate, inter alia, in the case of emergency lighting devices in which an emergency state can also be signalled in another manner, as an alternative or in addition to the monitoring of the electric power supply. Thus, in the case of the emergency lighting device according to the invention, for example, an emergency signal could also be transmitted via a separate control input, e.g. from a fire alarm or another control device, in order to initiate emergency lighting operation through an external signal.

A further development, finally, relates to the previously mentioned value tables stored in the control unit, which are necessary for indirect determination of the input voltage and of the diode current.

As has already been mentioned, these value tables can be already stored in the control unit during the production of the emergency lighting device. Alternatively, or in addition thereto, however, it would also be conceivable for this information to be entered retroactively or updated at a later point in time. A digital interface, for example, provided in the emergency lighting device, could be used for this purpose, which interface is usually used for fault signalling and monitoring. New value tables could then be entered into the control unit with the aid of this interface, with the use of an expanded instruction set. This retroactive entering of new information is appropriate, for example, for specifying new setpoint or tolerance values for the input voltage or, also, for adapting the information for determining the non-directly measured quantities to the connected battery. As a result, therefore, the emergency lighting device can be adapted to new circumstances at any time in respect of its behaviour.

Taken as a whole, therefore, there is provided by the present invention a new type of emergency lighting device, which is distinguished by its simple and inexpensively realized structure and which nevertheless enables an emergency situation to be ascertained through monitoring of the general mains supply. Moreover, a constant light output beyond the duration of an emergency operation is ensured through the advantageous regulation of the diode current.

The invention claimed is:

1. An LED driver for operating a light source, in particular an LED, comprising:
    an energy storage unit;
    a driver circuit supplied by the energy storage unit during emergency lighting operation, for operating the light source; and
    a control unit that activates the driver circuit in such a way that the light source is operated with a constant power or constant current irrespective of the state of charge of the energy storage unit;
    wherein the control unit, for the purpose of regulating the power, determines indirectly the level of the current supplied to the light source by measuring a plurality of magnitudes of a plurality of operating parameters of an emergency lighting device on a secondary side of a charging circuit.

2. An LED driver according to claim 1, wherein the control unit calculates the level of the current supplied to the light source on the basis of the voltage present at the light source.

3. An LED driver according to claim 2, wherein the control unit, in calculating the current supplied to the light source, takes account of the power loss of the driver circuit.

4. An LED driver according to claim 3, wherein the determination of the power loss of the driver circuit is effected through comparison of measured operating quantities of the LED driver with a value table stored in the control unit.

5. An LED driver according to claim 4, wherein the control unit, in calculating the current supplied to the light source, further takes account of the secondary power of the charging circuit or of a charging circuit for the energy storage unit.

6. An LED driver according to claim 5, wherein the determination of the secondary power of the charging circuit is effected through comparison of measured operating quantities of the LED driver with a further value table stored in the control unit.

7. An LED driver according to claim 6, wherein the LED driver has an interface for receiving external information for programming and/or updating the value table(s) stored in the control unit.

* * * * *